United States Patent [19]

Amano et al.

[11] Patent Number: 4,984,905

[45] Date of Patent: Jan. 15, 1991

[54] TEMPERATURE AND PRESSURE DETECTING TYPE SPARK PLUG

[75] Inventors: Kozo Amano; Yoshihiro Matsubara, both of Nagoya, Japan

[73] Assignee: NGK Spark Plug Co., Ltd., Nagoya, Japan

[21] Appl. No.: 494,339

[22] Filed: Mar. 16, 1990

[30] Foreign Application Priority Data

Apr. 3, 1989 [JP] Japan ................. 1-39502[U]

[51] Int. Cl.$^5$ .................... G01K 1/14; G01K 1/26
[52] U.S. Cl. ................................ 374/143; 73/116; 340/438; 374/144
[58] Field of Search ........... 374/143, 144; 73/116; 340/438

[56] References Cited

U.S. PATENT DOCUMENTS

| | | | |
|---|---|---|---|
| 4,028,943 | 6/1977 | Hyanova et al. | 73/116 X |
| 4,361,036 | 11/1982 | Levenson | 374/144 X |
| 4,554,927 | 11/1985 | Fussell | 374/143 X |
| 4,576,049 | 3/1986 | Köhnlechner | 374/143 X |

Primary Examiner—Daniel M. Yasich
Attorney, Agent, or Firm—Sughrue, Mion, Zinn, Macpeak & Seas

[57] ABSTRACT

A temperature and pressure detecting type spark plug has a metallic shell having a mounting seat around an outer surface of the shell. The plug further has a center electrode which is placed into a tubular insulator.

The center electrode has a hollow portion to enclose a thermocouple to detect a temperature of the front end of the center electrode.

An annular pressure sensor is placed at the mounting seat of the metallic shell to detect a pressure within a combustion chamber in a cylinder head. The pressure sensor is arranged to be sandwiched between the mounting seat and the cylinder head when the spark plug is secured to the cylinder head of an internal combustion engine.

8 Claims, 2 Drawing Sheets

TEMPERATURE AND PRESSURE DETECTING TYPE SPARK PLUG

BACKGROUND OF THE INVENTION

1. Field of the Invention

This invention relates to a temperature and pressure detecting type spark plug which is used for carrying out a matching test between an engine and a spark plug.

2. Description of the Prior Art

For the purpose of determining which type of a spark plug is the most compatible for a certain kind of an engine, various types of spark plugs are, in turn, secured to the engine, and the engine is operated under the different conditions of air-fuel ratio, temperature of a cylinder, temperature of intake-air, ignition timing, revolution (R.P.M.), intake-air pressure, exhaust-air pressure and the like.

In carrying out this matching test, it is important to detect a temperature of a center electorode in determining a compatibility of the spark plug to be tested. Low temperature of the electrode causes to deposit carbon so as to adversely effect on ignition.

High temperature of the electrode causes to introduce a preignition in which an ignition accidentally occurs before normal one does A spark plug has been suggested which is capable of detecting a temperature of a center electrode in carrying out the matching test.

Such a spark plug has a center electrode, inner portion of which has an axial hollow. With a front end of the hollow, is a thermocouple provided to form a thermorsensor which detects a temperature of the front end of the center electrode.

The thermocouple is made of suitable combination of wires, a connection point of which forms a temperature-detector.

The thermocouple is enclosed into the hollow, so that the plug remains substantially compact compared to a counterpart in which a thermosensor is not provided.

The spark plug is such that it is possible to precisely detect a temperature of a spark plug (the center electrode), and expediting to inform us of the combustive condition within a combustion chamber which includes that of the preignition.

In recent years, however, operation conditons of the spark plug has been severe with high output of the engine, so that the temperature of the center electrode can extraordinarily rise because of abnormal combustion or the like. It is difficult to determine whether the abnormal combustion is caused by knocking, preignition or postignition, thus leading to mismatching between the spark plug and the engine.

Therefore, it is an object of this invention to provide a temperature and pressure detecting type spark plug which is capable of detecting a temperature of a center electrode, and at the same time, detecting a knocking of an engine by providing a pressure sensor and a thermosenseor without affecting on a structural compactness, and enabling to precisely determine in which a temperature rise of the center electrode is caused.

According to the present invention, there is provided a temperature and pressure detecting type spark plug comprising a cylindrical metallic shell having a mounting seat around an outer surface of the shell so as to secure the shell to a cylinder head of an internal combustion engine, an insulator concentrically disposed in the metallic shell, and having an axial bore in lengthwise direction, a center electrode concentrically disposed in the axial bore of the insulator so as to form a discharge gap with an outer electrode which is depended from th metallic shell, a hollow portion axially provided with, at least, a front end of the center electrode to enclose a thermocouple which form a thermosensor to detect a temperature of the front end of the center electrode, and an annular pressure sensor placed at the mounting seat of the metallic shell to detect a pressure within a combustion chamber in the cylinder head, the pressure sensor being sandwiched between the mounting seat and the cylinder head when the spark plug is secured to the cylinder head.

Further, a coaxial three-polar terminal is provided with a rear end of the center electrode, the terminal having a contact for connecting it to a high tension code, and at the same time, having a pair of contacts which is connected to the thermocouple.

According to the invention, the pressure sensor and the thermosensor are, in turn, secured to the metallic shell and the center electrode, thus making it possible to maintain structural compactness, and expediting to easily mount the spark plug on the engine and removing it from the engine at the same time of carrying out the matching test.

It enables to detect the knocking of the engine and a peak pressure in the combustion chamber simultaneously when detecting a temperature of the center electrode at the time of matching test.

The temperature of the center electrode is stable when the engine is operating under the normal condition, but its temperature may extraordinarily rise due to abnormal combustion within the combustion chamber.

In this instance, detecting a pressure within the combustion chamber enables to precisely determine the knocking phomomenon which is one of the causes of the abnormal combustion, thus contributing to analysis of the combustive condition of the engine.

Even in the cases in which the temperature of the center electrode is stable, the knocking may occur on the engine which apparently does damage on the engine. It is difficult to determine this kind of knocking by a temperature-rise responding system.

However, the pressure sensor makes it possible to precisely determine the knocking phonomenon to protect the engine against damage.

Further, it enables to detect the temperatrue of the center electrode, the knocking phonomenon, and the peak pressure within the combustion chamber simultaneously, thus providing a convenience in checking the combustive condition of the engine which plays an important role on the reserch and development of an improved engine.

In addition, a coaxial three-polar terminal contributes to make a connection structure compact.

This structure needs only to put a shield cap into the terminal, and take off from the terminal when the spark plug is mounted on the engine, and removed from it at the time of matching test.

These and other aspects of this invention are more fully described in the following specification and drawings.

DETAILED DESCRIPTION OF THE EMBODIMENT

Figure 1:
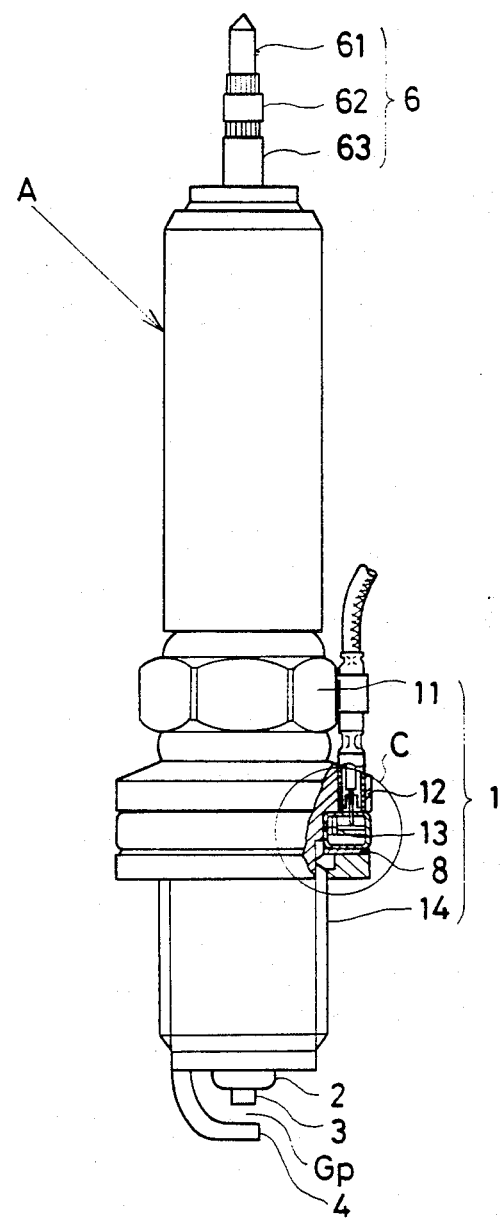
FIG. 1 is an elevational view of a spark plug but partly sectioned.
Figure 2:
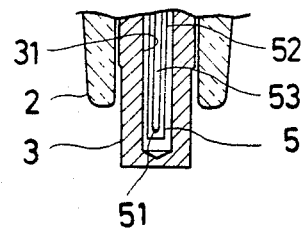
FIG. 2 is an enlarged sectional view showing a front portion of a center electrode; and FIG. is an enlarged sectional view showing a pressure sensor.
Figure 3:
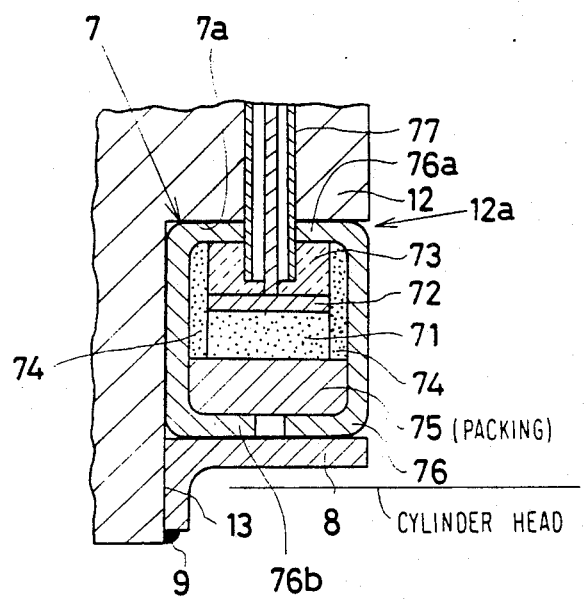

Referring to FIGS. 1 through 3, one embodiment of the invention is described hereinafter. A spark plug (A) is of temperature and pressure detecting type, and adapted to be secured to a cylinder head of an internal combustion engine (not shown).

The spark plug (A) has a cylindrical metallic shell 1 at an outer side. Into the metallic shell 1, a ceramic insulator 2 is concentrically disposed.

The insulator 2 is in the form of tubular configuration, an inner portion of which serves as an axial bore.

Into the axial bore of the insulator 2, a center electrode 3 is concentrically disposed with its front end somewhat extended from that of the insulator so as to expose the front end of the center electrode 3 to a combustion chamber (not shown) of the engine when the spark plug (A) is secured to the cylinder head of the engine. The center electrode 3 forms a discharge gap (Gp) with an outer electrode 4 integrally depended from the metallic shell 1.

As shown in FIG. 2, a hollow portion 31 is provided with the center electrode 3 in the lengthwise direction. Into the hollow portion 31, a thermocouple 5 is placed to act as a thermosensor. The thermocouple 5 is made of Chromel wire 52 and Alumel wire 53, a connection point of which serves as a temperature detecting point 51 which is located at the end of the center electrode 3.

It is noted for the purpose of reference that the Chromel is an alloy of nickel (Ni) and chromium (Cr), while the Alumel an alloy of nickel (Ni) and aluminium (Al).

To the rear end of the center electrode 3, a coaxial three-polar terminal 6 is connected. The terminal 6 has a contact 63 connected to the electrode 3 as shown in FIG. 2 for a high tension code, and at the same time, having a pair of contacts 61, 62 which, in turn, are connected to the Chromel wire 52 and the Alumel wire 53.

Meanwhile, the metallic shell 1 has a hexgonal head portion 11, a diameter-increased portion 12, a diameter-reduced portion 13 and a screw nut portion 14. A border portion between the diameter-increased portion 12 and the diameter-reduced portion 13 forms a step 7a which serves as a mounting seat 12a which is provided with an outer surface of the metallic shell 1.

Into the diameter-reduced portion 13, an annular metallic casing 76 is inserted with its upper surface engaging against a lower surface of the step 7a. The casing 76 is rectangular in section, and forming a part of a pressure sensor 7.

The casing 76 is further supported by a support seat 8 which is secured to the diameter-reduced portion 13 by means of a seam welding 9 so as to maintain air-tightness between the diameter-reduced portion 13 and the casing 76.

As shown in FIG. 3, the pressure sensor 7 comprises an annular piezoelectric element 71, an inner electrode layer 72 and an insulation layer 73 each tightly laminated on a packing layer 75, which, in turn, enclosed into the metallic casing 76. Insulation ring 74, 74 are provided with inner and outer circumferential side of the lamination in a manner to sandwich the lamination.

A lead wire 77 is connected to an upper side of the inner electrode layer 72.

When the spark plug (A) is mounted on the cylinder head of the internal combustion engine by means of a tool such as for, example, a wrench, the piezoelectric element 71 is sandwiched between the cylinder head and the step 7a of the mounting seat 12a through an upper surface 76a and lower surface 76b of the casing 76 which act as a pressure-receiving section respectively. The pressure sensor 7 detects a pressure within the combustion chamber of the engine by mechanical strains of the piezoelectric element 71 which turns the strains to electrical signals so as to send them to an exterior instrument (not shown) by way of the lead wire 77.

It is noted that the thermocouple may be made of a copper (Cu) and Constantan (40%Ni, 60%Cu) instead of combination of Chromel and Alumel.

It is also appreciated that the support seat 8 may be secured by means of an electrical resistant welding instead of the seam welding 9.

Further, it is noted that the piezoelectric element is used as a pressure element, however, a semiconductor may be used as a pressure-sensitive element.

Although the embodiments and invention has been illustrated in the accompanying drawing and described in the foregoing detailed description, it will be understood that the invention is not limited to the embodiments disclosed, but is capable of numerous rearrangements, modifications and substitutions without departing from the scope of the invention.

What is claimed is:

1. A temperature and pressure detecting type spark plug comprising;
   a cylindrical metallic shell having a mounting seat around an outer surface of the shell so as to secure the shell to a cylinder head of an internal combustion engine;
   an insulator concentrically disposed in the metallic shell, and having an axial bore in lengthwise direction;
   a center electrode concentrically disposed in the axial bore of the insulator so as to form a discharge gap with an outer electrode which is depended from the metallic shell; a hollow portion axially provided with, at least, a front end of the center electrode to enclose a thermocouple which form a thermosensor to detect a temperature of the front end of the center electrode; and
   an annular pressure sensor placed at the mounting seat of the metallic shell to detect a pressure within a combustion chamber in the cylinder head, the pressure sensor being sandwiched between the mounting seat and the cylinder head when the spark plug is secured to the cylinder head.

2. In a temperature and pressure detecting type spark plug as recited in claim 1, the thermocouple of the thermosensor is formed of Chromel-Alumel wire.

3. In a temperature and pressure detecting type spark plug as recited in claim 1, the metallic shell has, at least, a diameter-increased portion and a diameter-reduced portion, the annular pressure sensor being inserted into the diameter-reduced portion with an upper surface of the pressure sensor engaging against an underside of a step portion which is a border between the diameter-increased portion and the diameter-reduced portion.

4. In a temperature and pressure detecting type spark plug as recited in claim 1, the pressure sensor is a piezoelectric element which is enclosed into a metallic casing, the casing being rectangular in section, upper and lower side of which works as a pressure-receiving section.

5. In a temperature and pressure detecting type spark plug as recited in claim 4, the metallic casing is supported by a metallic support seat which is secured to the metallic shell by means of welding.

6. In a temperature and pressure detecting type spark plug as recited in claim 5, the welding makes it possible to maintain an air-tightness between the metallic shell and the pressure sensor.

7. In a temperature and pressure detecting type spark plug as recited in claim 5, an insulator plate is provided with an outer and inner circumferential side of the piezoelectric element in a manner to sandwich the element.

8. In a temperature and pressure detecting type spark plug as recited in claim 1, a coaxial three-polar terminal is provided with a rear end of the center electrode, the terminal having a contact for connecting it to a high tension code, and at the same time, having a pair of contacts which is connected to the thermocouple.

* * * * *